(12) United States Patent
Maeshima

(10) Patent No.: US 6,501,742 B1
(45) Date of Patent: Dec. 31, 2002

(54) RADIO COMMUNICATING METHOD

(75) Inventor: Yasunori Maeshima, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/294,378

(22) Filed: Apr. 20, 1999

(30) Foreign Application Priority Data

Apr. 24, 1998 (JP) .......................................... 10-114920

(51) Int. Cl.⁷ ............................................... H04L 12/46
(52) U.S. Cl. ...................................... 370/315; 370/351
(58) Field of Search ................................. 370/328, 338, 370/401, 351, 310, 315; 455/518, 519

(56) References Cited

U.S. PATENT DOCUMENTS

| | | | | |
|---|---|---|---|---|
| 5,371,900 A | * | 12/1994 | Bar-On et al. ............. | 455/53.1 |
| 5,434,856 A | * | 7/1995 | Huang | |
| 5,493,696 A | * | 2/1996 | Wolf ........................... | 455/56.1 |
| 5,987,011 A | * | 11/1999 | Toh ............................. | 370/331 |
| 5,987,331 A | * | 11/1999 | Grube et al. ................ | 455/509 |
| 6,115,388 A | * | 9/2000 | Chinitz et al. .............. | 370/441 |
| 6,188,767 B1 | * | 2/2001 | Needham et al. ........... | 380/271 |

* cited by examiner

Primary Examiner—Ken Vanderpuye
(74) Attorney, Agent, or Firm—Jay H. Maioli

(57) ABSTRACT

Whether a communication is possible among nodes which transmit data in a wireless manner is discriminated and the nodes which can mutually communicate thereamong are set to the same group. In each node, if a node which can communicate with two or more groups exists, the node which can communicate among the groups is set to a bridge connecting the different groups. In case of communicating with the nodes among the different groups, a communication is performed via the node that has been set as a bridge.

3 Claims, 3 Drawing Sheets

RADIO COMMUNICATING METHOD

BACKGROUND OF THE INVENTION

1. Field of the Invention

The invention relates to a radio communicating method of performing a data communication among a plurality of nodes in a wireless manner.

2. Description of the Related Art

Recently, a digitization of audio equipment and video equipment such as CD (Compact Disc) player, MD (Mini Disc) recorder/player, digital VTR, digital camera, DVD (Digital Versatile Disc) player, and the like has been progressing. By the spread of a personal computer, a system such that those digital audio equipment or digital video equipment is connected to the personal computer and various controls can be performed by the personal computer has appeared. As mentioned above, as an interface to construct a system such that each digital audio equipment and each digital video equipment are connected or a system such that those equipment and the personal computer are connected, attention is paid to IEEE (Institute of Electrical and Electronics Engineers) 1394.

In IEEE1394, an isochronous transfer mode and an asynchronous transfer mode are supported. The isochronous transfer mode is preferable to transfer a time-sequential data stream such as video data or audio data at a high speed. The asynchronous transfer mode is preferable to, for example, transfer various commands or files. As mentioned above, in IEEE1394, since the isochronous transfer mode and the asynchronous transfer mode are supported, if IEEE1394 is used as an interface, the video data or audio data can be easily transferred between the digital audio equipment and the digital video equipment or those equipment and the personal computer are connected and various controls and an edition can be easily performed by the personal computer.

However, IEEE1394 is a wired interface. To construct the system as mentioned above by the wired interface, a wiring is necessary and a cable is likely to be complicated. In the wired interface, it is difficult to connect a plurality of equipment existing in a remote room in a home.

The applicant of the present invention, therefore, has proposed a wireless LAN which can connect digital audio equipment and digital video equipment or those equipment and a personal computer in a wireless manner and can be used in a manner similar to IEEE1394.

As mentioned above, if the wireless LAN is used, a wiring is unnecessary and data can be easily transmitted among the equipment. However, since there is a limitation in an arrival distance of a radio wave, a data communication cannot be performed among the nodes existing at remote positions. Even if the nodes exist at close positions, a data communication cannot be performed between the nodes between which an object such as a wall or the like which obstructs a radio wave exists. As mentioned above, in the wireless LAN, there is a case where the nodes which cannot mutually perform a data communication exist although they are located on the same transmission path. There is a problem such that a data transmission cannot be performed between such nodes.

OBJECTS AND SUMMARY OF THE INVENTION

It is, therefore, an object of the invention to provide a radio communicating method which can perform a data communication even-to nodes which cannot mutually directly perform a data communication.

According to the invention, there is provided a radio communicating method of mutually performing a radio communication among three or more nodes, comprising the steps of: discriminating whether a communication is possible among the nodes or not; grouping the nodes which can communicate thereamong as a same group; and setting a node which can communicate with two or more groups to a bridge for relaying a data transfer between the two groups.

Whether a communication is possible among the nodes to which data is transmitted in a wireless manner or not is discriminated and the nodes which can communicate thereamong are grouped to the same group. In each node, if a node which can communicate with two or more groups exists, this node is used as a bridge. In case of communicating with the nodes between the different groups, a communication is performed through the node decided as a bridge. As mentioned above, if one node existing among a plurality of groups is used as a bridge, a data communication can be performed even among the nodes of the different groups. Even if the nodes exist at remote positions or an obstacle of a radio wave exists between the nodes, a communication can be performed.

The above and other objects and features of the present invention will become apparent from the following detailed description and the appended claims with reference to the accompanying drawings.

DETAILED DESCRIPTION OF THE PREFERRED EMBODIMENT

Figure 1:
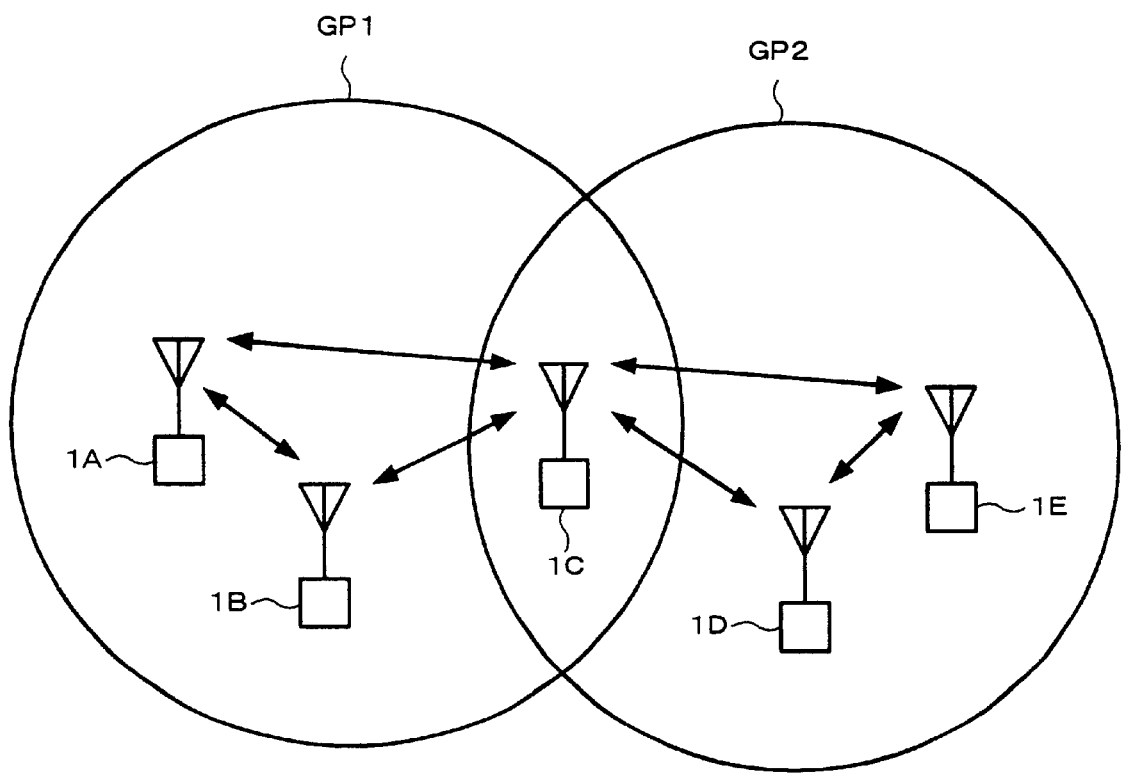
FIG. 1 is a schematic diagram for use in the explanation of an example of a wireless LAN system to which the invention can be applied.

An embodiment of the invention will now be described hereinbelow with reference to the drawings. FIG. 1 shows an example of a radio communication system to which the invention is applied. In FIG. 1, reference numerals 1A, 1B, 1C, 1D, and 1E denote wireless nodes.

Figure 2:
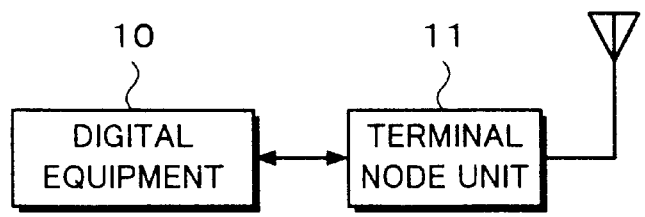
FIG. 2 is a block diagram for use in the explanation of a wireless node.

As shown in FIG. 2, each of the wireless nodes 1A to 1E is constructed by connecting a terminal node unit 11 to digital equipment 10. As digital equipment 10, a CD player, an MD recorder/player, a digital VTR, a digital camera, a DVD player, or the like which can perform a digital input/output is used in addition to a personal computer or a printer. The digital equipment 10 and terminal node unit 11 are connected through, for example, an interface of IEEE1394.

The terminal node unit 11 is a unit to perform a digital communication in a wireless manner and comprises: a modulating circuit to modulate transmission data; a transmitting circuit to convert the modulated transmission data to a predetermined frequency and transmit; a receiving circuit to receive data from another node; a demodulating circuit to demodulate the data from the receiving circuit; and the like.

As a modulation system, an FSK (Frequency Shift Keying) modulation, a PSK (Phase Shift Keying)

modulation, a QPSK (Quadrature Phase Shift Keying) modulation, or a QAM (Quadrature Amplitude Modulation) modulation is used. Further, a spread spectrum system or an OFDM (Orthogonal Frequency Division Multiplexing) system can be used. As a data transmission system, in addition to a CSMA/CA (Carrier Sense Multiple Access/Contention Protocol) system, a time division multiplexing system by a slot allocation or the like can be used.

As shown in FIG. 1, the wireless nodes 1A to 1E are arranged at remote positions, a data communication is performed among the wireless nodes 1A to 1E in a wireless manner, and a wireless LAN is constructed.

In case of such a wireless LAN, however, an area where a data communication can be performed is limited to the nodes existing at positions where a radio wave can be transmitted and received. When the nodes exist at remote positions or there is an obstacle between the nodes, a data communication cannot be performed.

In a system to which the invention is applied, therefore, the nodes which can communicate are grouped and in the case where a node which can communicate with two or more groups exists, this node is set to a bridge connecting the two groups. By performing a communication among the nodes via the bridge, a data communication can be performed among all of the nodes.

That is, among the wireless nodes 1A to 1E, a communication is first tried among the nodes, so that with which node a communication is possible is discriminated. Whether the communication is possible or not is discriminated, for example, from a signal level of a reception signal.

In the example shown in FIG. 1, a communication is tried among the wireless nodes 1A to 1E. Whether the communication is possible or not is discriminated from the level of the reception signal of each of the nodes 1A to 1E. Thus, it is assumed that the data communication with the following wireless nodes is possible.

The wireless node 1A can communicate with the wireless nodes 1B and 1C but cannot communicate with the wireless nodes 1D and 1E. The wireless node 1B can communicate with the wireless nodes 1A and 1C but cannot communicate with the wireless nodes 1D and 1E. The wireless node 1C can communicate with the wireless nodes 1A, 1B, 1D, and 1E. The wireless node 1D can communicate with the wireless nodes 1C and 1E but cannot communicate with the wireless nodes 1A and 1B. The wireless node 1E can communicate with the wireless nodes 1C and 1D but cannot communicate with the wireless nodes 1A and 1B.

In such a case, the nodes which can communicate data are grouped as a same group. That is, in the example shown in FIG. 1, since the wireless nodes 1A, 1B, and 1C can mutually perform a data communication, they are set to a same group GP1. Since the wireless nodes 1C, 1D, and 1E can mutually perform a data communication, they are set to a same group GP2.

In case of grouping as mentioned above, a node which belongs to both groups exists. That is, the wireless node 1C can perform a data communication with the wireless nodes 1A and 1B and can also perform a data communication with the wireless nodes 1D and 1E and belongs to the two groups GP1 and GP2. The node belonging to the two groups GP1 and GP2 as mentioned above functions as a bridge connecting the groups GP1 and GP2. As for the wireless nodes, when a data communication is performed among the nodes belonging to the same group, a data communication is directly performed with the nodes. When a data communication is performed with the nodes belonging to a different group, the data communication is performed via the node serving as a bridge.

For example, when the wireless node 1A performs a data communication with the wireless nodes 1B and 1C belonging to the same group GP1, the data communication is directly performed with the wireless nodes 1B and 1C. In case of performing a data communication with the wireless nodes 1D and 1E belonging to the different group GP2, the data communication is performed via the wireless node 1C serving as a bridge.

As mentioned above, in the system to which the invention is applied, the wireless nodes which can mutually perform a data communication are grouped and the node belonging to a plurality of groups is used as a bridge. In this manner, by using the node existing among a plurality of groups as a bridge, the data communication can be performed even among the nodes existing at remote positions or even if there is an obstacle stopping a radio wave.

Figure 3:
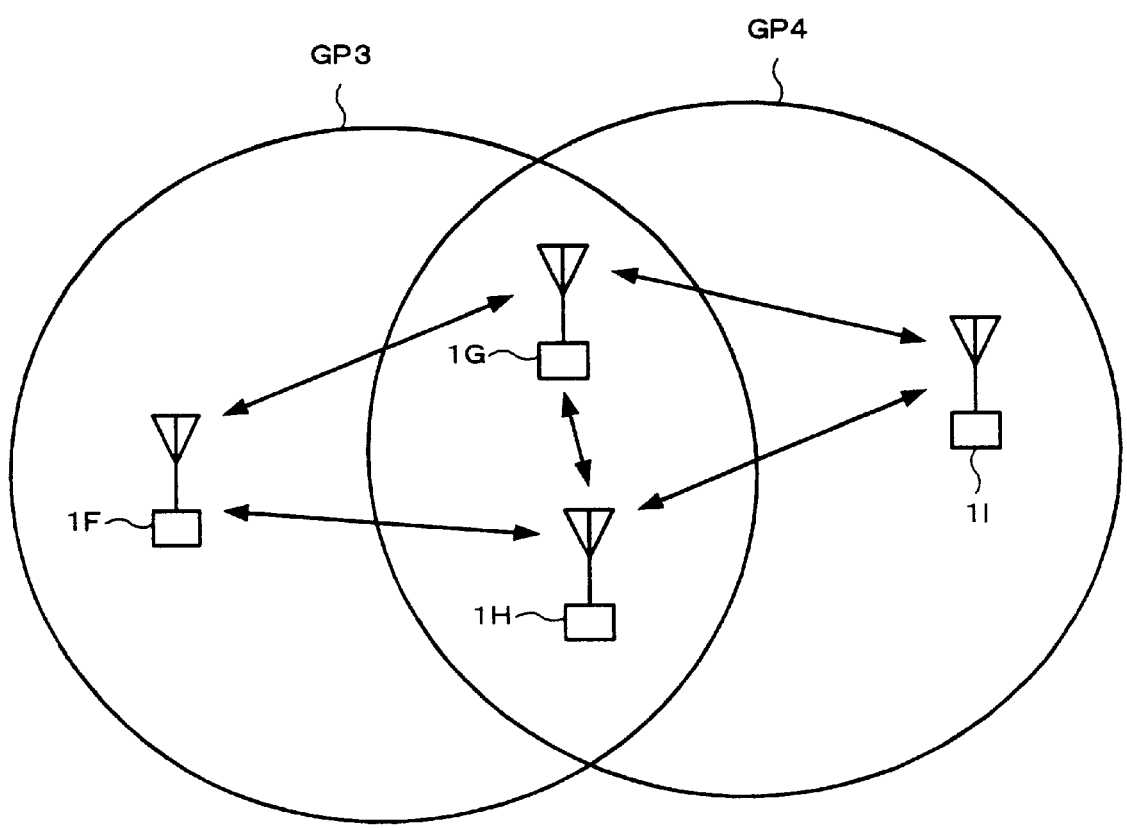
FIG. 3 is a schematic diagram for use in the explanation of an example of a wireless LAN system to which the invention can be applied.

In the example of FIG. 1 mentioned above, although the node belonging to the two groups GP1 and GP2 is one wireless node 1C, a case where a plurality of nodes belonging to two groups exist is also considered. For example, in a case shown in FIG. 3, the wireless nodes 1F, 1G, and 1H can mutually perform a data communication and are grouped to a group GP3 and the wireless nodes 1G, 1H and 1I can mutually perform a data communication and are grouped to a group GP4.

When there are a plurality of nodes belonging to two groups as mentioned above, by predetermining the number of nodes serving as bridges to one, a routing can be easily performed. It is also possible to provide a routing manager and to decide a node optimum to bridge each time. The node optimum for routing is determined in consideration of an intensity of the signal from the node of each group, an error rate, and a use frequency of the node.

Figure 4:
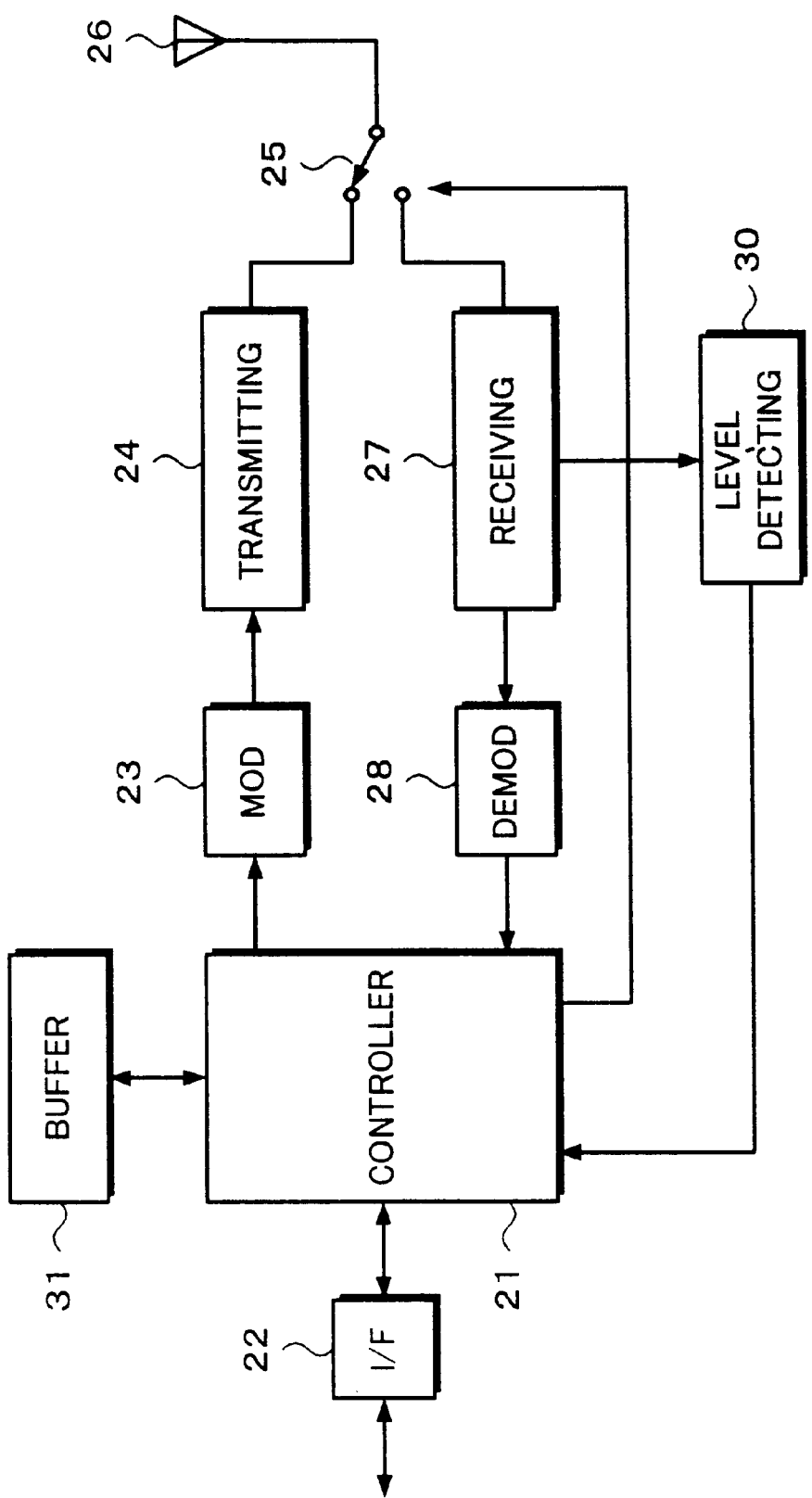
FIG. 4 is a block diagram of an example of a terminal node unit in the wireless LAN system to which the invention can be applied.

FIG. 4 shows an example of the terminal node unit 11 to which the invention can be applied. In FIG. 4, the terminal node unit 11 is connected to digital equipment via an interface 22.

For example, IEEE1394 can be used as an interface 22. IEEE1394 supports the isochronous mode and the asynchronous mode and is suitable for use in high speed transfer of video data. A serial interface such as RS232C or the like can be also used as an interface 22.

Transmission data sent via the interface 22 is supplied to a controller 21. In the controller 21, the transmission data is converted into a packet of a predetermined format. A source address and a destination address are added to the packet. The transmission packet is supplied to a modulating circuit 23.

The data is modulated in the modulating circuit 23. For example, the FSK modulation, PSK modulation, QPSK modulation, or QAM modulation is used as a modulation system. In case of using the spread spectrum system, a PN code is multiplied to the data which was primary-modulated. In case of using the OFDM system, the primary-modulated data is serial/parallel converted and is modulated by an IFFT (Inverse Fast Fourier Transform) conversion by using a plurality of carriers having an orthogonal relation.

An output of the modulating circuit 23 is supplied to a transmitting circuit 24. The transmitting circuit 24 has a frequency converting circuit for converting a transmission signal into a predetermined frequency, an output amplifier for amplifying the transmission signal to a predetermined level, and the like. An output of the transmitting circuit 24 is supplied to an antenna 26 via an antenna switch 25.

A signal from the other wireless node is received by the antenna 26. The reception signal is supplied to a receiving circuit 27. The reception signal is converted into a predetermined intermediate frequency signal by the receiving circuit 27. An output of the receiving circuit 27 is supplied to a demodulating circuit 28. The demodulating circuit 28 performs a demodulation of, for example, the FSK modulation, PSK modulation, QPSK modulation, or QAM modulation. In case of using the spread spectrum system, a circuit for multiplying a PN code similar to that upon modulation and performing an inverse conversion is provided. In case of the OFDM system, a circuit to FFT convert the reception signal, parallel/serial convert it, and perform a demodulation of the OFDM is provided.

An output of the demodulating circuit 28 is supplied to the controller 21. A reception packet is decomposed by the controller 21. The demodulated reception data is outputted via the interface 22.

A level detecting circuit 30 to detect an output level of the reception signal is provided for the terminal node unit 11 in the system to which the invention is applied. The reception level of the signal from the node on the partner side is detected by the level detecting circuit 30. An output of the level detecting circuit 30 is supplied to the controller 21.

In an initial state when the system is constructed, a communication is performed among the nodes. Whether the nodes are the nodes which can directly perform a data communication or not is discriminated. In this instance, the output of the level detecting circuit 30 is used to discriminate whether the nodes can directly perform the data communication or not. That is, the node on the partner side is designated, a signal is sent, and whether the signal from the partner side is returned or not is discriminated. If no signal is returned from the partner side, it is determined that the data communication cannot be performed. Even in the case where the signal is returned from the partner side, when the signal level is very small, it is decided that the data communication cannot be performed.

As mentioned above, the nodes which can directly perform the data communication are decided and these nodes are set to the same group. When the node belongs to two or more groups, this node is used as a bridge connecting the nodes which cannot mutually directly perform the data communication.

The terminal node unit 11 in the system to which the invention can be applied has a function as a bridge. In case of functioning as a bridge, the reception signal from the antenna 26 is supplied to the receiving circuit 27. The reception signal is converted into a predetermined intermediate frequency signal by the receiving circuit 27. An output of the receiving circuit 27 is supplied to the demodulating circuit 28. An output of the demodulating circuit 28 is supplied to the controller 21.

A buffer 31 is provided in the controller 21. The reception data is once stored into the buffer 31. The destination address is reallocated.

The data in which the destination address is reallocated is read out from the buffer 31 and is supplied to the modulating circuit 23. The transmission packet data is modulated by the modulating circuit 23. An output of the modulating circuit 23 is supplied to the transmitting circuit 24. In the transmitting circuit 24, the transmission signal is converted into a predetermined transmitting frequency and is amplified to a predetermined level. An output of the transmitting circuit 24 is supplied to the antenna 26.

According to the invention, whether a communication is possible among the nodes which transmit data in a wireless manner or not is discriminated. The nodes which can communicate thereamong are set to the same group. In each node, if there is a node which can communicate with two or more groups, this node is used as a bridge. In case of communicating with the nodes between the different groups, the communication is performed through the node decided as a bridge. As mentioned above, if one node belonging to a plurality of groups is used as a bridge, the data communication can be performed even among the nodes of the different groups. The communication can be performed even among the nodes existing at remote positions or even if there is an obstacle of the radio wave.

The present invention is not limited to the foregoing embodiment but many modifications and variations are possible within the spirit and scope of the appended claims of the invention.

What is claimed is:

1. A radio communicating method of performing a radio communication among three or more nodes, comprising the steps of:

discriminating whether a direct radio communication is possible among the nodes;

grouping the nodes that can communicate directly thereamong as a same group; and setting a node which can directly communicate with all members of two or more groups to a bridge for relaying a data transfer between said two groups.

2. A method according to claim 1, wherein when there are a plurality of nodes that can directly communicate with all members of said two or more groups, a predetermined one node is used as the bridge.

3. A method according to claim 1, wherein when there are a plurality of nodes that can directly communicate with all members of said two or more groups, an optimum one of said plurality of nodes is selected and used as a bridge based on at least an intensity of signal strength from a node of each of the plurality of nodes that can communicate with all members of said two or more groups.

* * * * *